United States Patent [19]
Monta et al.

[11] Patent Number: 5,317,410
[45] Date of Patent: May 31, 1994

[54] I-AXIS DETECTING CIRCUIT PROVIDED IN COLOR DEMODULATING CIRCUIT OF TV RECEIVER

[75] Inventors: Hiroki Monta; Toshiaki Tsuji, both of Ibaraki; Kiyoshi Imai, Kyoto, all of Japan

[73] Assignee: Matsushita Electric Industrial Co., Ltd., Osaka, Japan

[21] Appl. No.: 836,752

[22] Filed: Feb. 19, 1992

[30] Foreign Application Priority Data

Feb. 25, 1991 [JP] Japan ............................ 3-030115

[51] Int. Cl.⁵ .......................... H04N 9/65; H04N 9/66
[52] U.S. Cl. .................................. 348/638; 348/507; 348/726
[58] Field of Search .................. 358/23, 27, 17, 19, 358/158, 28, 13; H04N 9/65, 9/66

[56] References Cited

U.S. PATENT DOCUMENTS

| | | | |
|---|---|---|---|
| 4,463,371 | 7/1984 | Lewis, Jr. | 358/19 |
| 4,616,252 | 10/1986 | Schiff | 358/23 |
| 4,709,257 | 11/1987 | Suzuki | 358/23 |
| 4,843,455 | 6/1989 | Suzuki | 358/17 |
| 4,897,713 | 1/1990 | Nillesen | 358/17 |

OTHER PUBLICATIONS

NHK TV Technical Text (first volume) edited by Nippon Housou Kyoukai), date unknown.

Primary Examiner—James J. Groody
Assistant Examiner—Glenton B. Burgess
Attorney, Agent, or Firm—Stevens, Davis, Miller & Mosher

[57] ABSTRACT

An I-axis phase pulse is allowed to be detected at the sampling point of a chrominance signal with a digitally-implemented circuit. A chrominance signal (sampling frequency $f_1$) is subsampled by a frequency $f_2$ ($f_1/N$) and subsampling pulses generated in N subsampling pulse generators 10 for N phases, the adjacent ones of the pulses being shifted by one clock ($1/f_1$) with respect to one another. The subsampled chrominance signal is input to an I-axis determining circuit 17. The I-axis determining circuit operates to detect a maximum value $M_1$ of a color burst signal (sampling frequency $f_1$) and the data $M_2$ after one clock and compare both of the values with each other. Based on the compared result, a selecting signal $S_4$ is detected for selecting an I-axis phase pulse at the sampling point of the chrominance signal. A selecting circuit 18 selects, as an I-axis phase pulse $S_5$, a proper one of the N sampling pulse for N phases based on the selecting signal and applies the I-axis phase pulse $S_5$ to an (N+1)th subsampling circuit 19. The subsampling circuit 19 can provide an I-axis detected output $S_3$ at the sampling point of the chrominance signal.

3 Claims, 6 Drawing Sheets

S2 COLOR BURST SIGNAL $M_1$: MAXIMUM VALUE
$M_2$: DATA OF ONE AFTER CLOCK TO DATA
$K = 0.6$ (IF $KM_1 \leq M_2$, THE SUBSAMPLED DATA $M_2$ INDICATES AN I-AXIS PULSE)

(IF $KM_1 > M_2$, THE SUBSAMPLED DATA $M_1$ INDICATES AN I-AXIS PULSE)

I-AXIS DETECTING CIRCUIT PROVIDED IN COLOR DEMODULATING CIRCUIT OF TV RECEIVER

BACKGROUND OF THE INVENTION

The present invention relates to an I-axis detecting circuit which is used in a color demodulating circuit provided in a TV receiver of an NTSC system.

Two axis detecting circuits are provided in a color demodulating circuit of the NTSC-system TV receiver. To efficiently transmit a color signal, the NTSC system uses the color resolution of human eyes, which is superior in a cyan system belonging to an orange system (corresponding to the I-axis shown in FIG. 6) but inferior in a green and magenta system (corresponding to the Q-axis). This means that the NTSC broadcasting system is designed to make the transmission band in the I-axis direction wider and transmission in the Q-axis direction narrower for the purpose of efficiently transmitting a color signal.

Further, when transmitting a color signal in the NTSC system, the color signal is modulated in a balanced manner and overlapped with a luminance signal. At the TV receiver, the color signal is separated from the overlapped signal. Then, the I axis and Q axis are detected in the color signals and the colors are demodulated along the I axis and the Q axis. This is referred to as two-axes color demodulation.

One prior art method of the two-axes color demodulation is described in "NHK TV Technical Text" (first volume, edited by Nippon Housou Kyoukai). In the two-axes color demodulation, the same principle holds true of the I-axis and the Q-axis color demodulation. Hence, only the I-axis detecting circuit will be described later.

Herein, the description will be directed to one example of the conventional I-axis detecting circuit. The conventional circuit is shown in a block diagram of FIG. 5.

In FIG. 5, 1 is an input terminal at which a chrominance signal $S_1$ is applied, 2 is an input terminal at which a color burst signal $S_2$ is applied. 3 is a band amplifying circuit, 4 is an automatic color control (ACC) circuit, 5 is a circuit for amplifying a color burst signal, 6 is a circuit for generating a 3.58-MHz signal, 7 is an I-axis demodulating circuit, 8 is a phase shift circuit, and 9 is an output terminal at which an I-axis detected output appears.

The function of the I-axis detecting circuit arranged as above will be described below.

The chrominance signal $S_1$ is applied at the input terminal 1 and is sent to the band amplifying circuit 3 in which the chrominance signal $S_1$ is amplified to a level high enough to carry out the I-axis demodulation. The ACC circuit 5 serves to automatically adjust a gain of the band amplifying circuit 3 for the purpose of keeping the level of the color signal being led to the I-axis demodulating circuit 7 constant.

The amplifying circuit 5 serves to pick up a color burst signal $S_2$ from the chrominance signal $S_1$ and amplify the color burst signal $S_2$. The amplified color burst signal $S_2$ is input to the 3.58-MHz generating circuit 6 in which a color burst signal is newly produced for the use in the I-axis demodulating circuit 7.

As shown in FIG. 6A, the phase of the I axis is later than the color burst signal $S_2$ by 57 degrees, so that the phase shift circuit 8 may delay the output of the 3.58-MHz generating circuit by 57 degrees. In the I-axis demodulating circuit, the chroma signal $S_1$ whose band is amplified and the output of the phase shift circuit 8 are multiplied in an analog multiplier. Then, the resulting I-axis detected output $S_3$ (see FIG. 6B) appears at the output terminal 9.

The I-axis demodulating circuit 7 shown in FIG. 5 is arranged to have an analog multiplier. On the other hand, the I-axis detecting circuit implemented by a digital circuit has difficulty in detecting an I-axis phase at the sampling point of the chrominance signal $S_1$.

SUMMARY OF THE INVENTION

To overcome the above difficulty, it is an object of the present invention to provide a circuit which is capable of detecting the phase of an I axis at the sampling point of the chrominance signal in the implementation of a digital circuit.

In carrying out the object, the I-axis detecting circuit according to the present invention includes a first phase to an N-th phase subsampling circuits for subsampling a chrominance signal (sampling frequency $f_1$) by a frequency $f_2$ ($f_1/N$) and subsampling pulses for N phases, the adjacent ones of the subsampling pulses being shifted by one clock ($1/f_1$), an I-axis determining circuit being controlled in response to a color burst gate signal and for supplying a signal for selecting an I-axis phase pulse from the N subsampling pulses, a circuit for selecting one of the subsampling pulses for the N phases as an I-axis phase pulse, and an (N+1)th subsampling circuit for subsampling the chrominance signal by the I-axis phase pulse sent from the selecting circuit and supplying an I-axis detection signal.

In operation, the I-axis determining circuit serves to detect a maximum value $M_1$ of the color burst signal (sampling frequency $f_1$) and the data $M_2$ of the color burst signal of the following clock and compare both with each other. Based on the compared result, the phase of the I axis is allowed to be detected at the sampling point of the chrominance signal. This means that the I-axis determining circuit can employ digital implementation.

As described above, the I-axis detecting circuit provided in the color demodulating circuit of the TV receiver is capable of detecting the phase of the I axis at the sampling point of the chrominance signal if the color demodulating circuit is implemented digitally.

DESCRIPTION OF THE PREFERRED EMBODIMENTS

Figure 1:
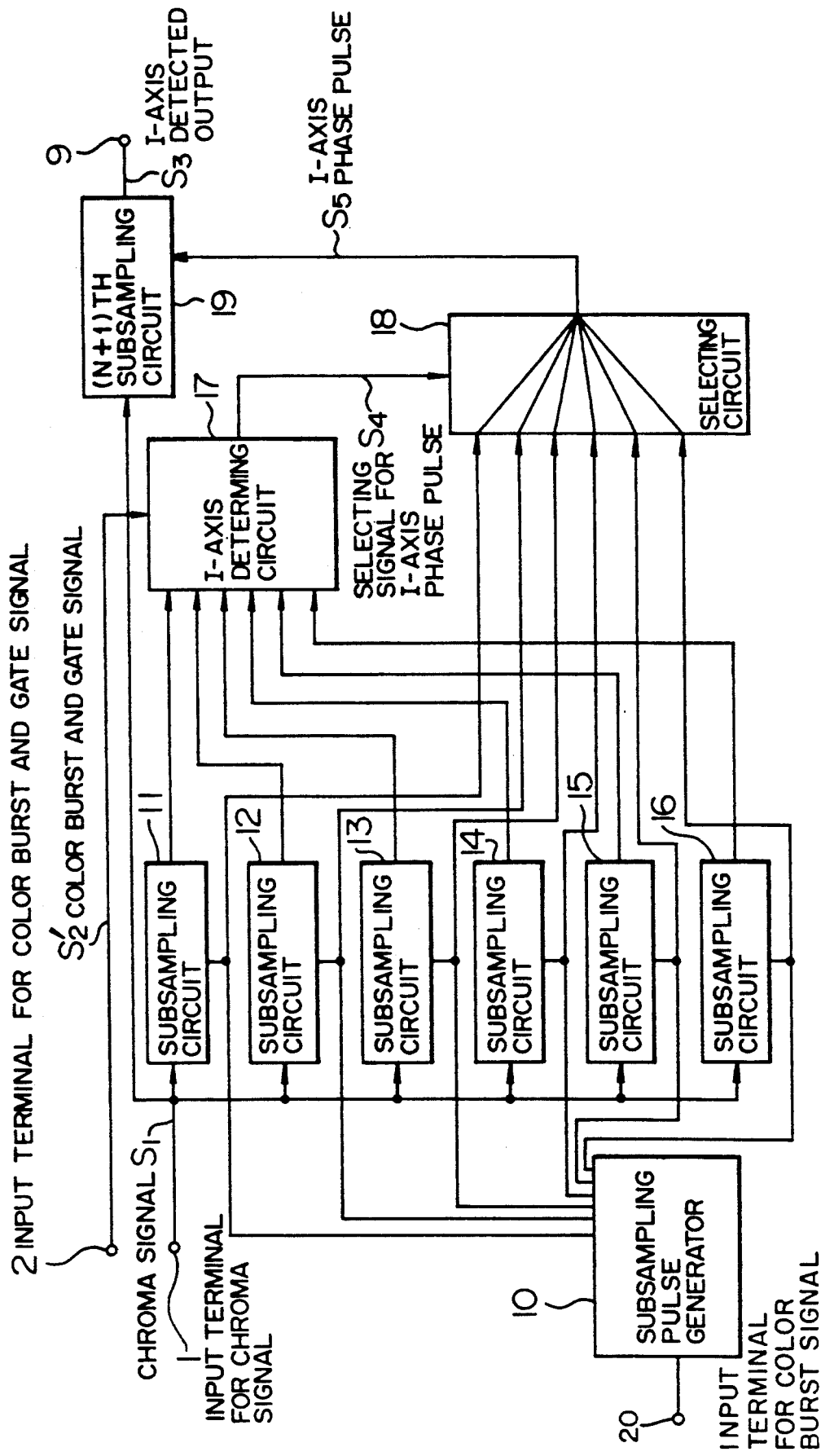
FIG. 1 a block diagram showing an I-axis detecting circuit according to an embodiment of the invention.

Hereafter, the description will be directed to an I-axis detecting circuit according to an embodiment of the invention as referring to the drawings, in which FIG. 1 is a block diagram showing the I-axis detecting circuit on the assumption that six phases are prepared.

In FIG. 1, 10 denotes a six-phase (N=6) subsampling pulse generator which serves to generate six-phase subsampling pulses, the adjacent ones of those pulses being shifted by one clock ($1/f_1$) with respect to one another. Subsampling pulse generator 10 receives the color burst signal at input 20 so as to provide phase control. The chrominance signal $S_1$ (sampling frequency $f_1$) is subsampled by frequency a $f_2$ ($f_1/N$) and the subsampling pulses. 11 to 16 denote subsampling circuits in which the chrominance signal $S_1$ is subsampled by the six subsampling pulses sent from the circuit 10. 17 denotes an I-axis determining circuit which serves to receive the subsampling pulses from the subsampling circuits 11 to 16 and supply one of the six subsampling pulses as a selecting signal $S_4$ of the I-axis phase pulse. During the operation, the I-axis determining circuit 17 is controlled on and off by a color burst gate signal $S_2'$. 18 denotes a selecting circuit. The selecting circuit 18 obtains a phase pulse $S_5$ of an I phase which corresponds to a selected one of the subsampling pulses sent from the six-phase subsampling pulse generator 10. The subsampling pulses are selected by the selecting signal $S_4$. 19 denotes a (N+1)th subsampling circuit. In the circuit 19, the chrominance signal $S_1$ is subsampled by the I-phase pulse $S_5$ sent from the selecting circuit 18. The subsampled result appears as an I-axis detecting output $S_3$ at an output terminal 9.

Next, the description will be directed to the operation of the subsampling pulse generator. At first, the chrominance signal $S_1$ (sampling frequency $f_1$) is subsamplied by a frequency $f_2$ ($f_1/6$). Then, the chrominance signal $S_1$ is subsamplied in the subsampling circuits 11 to 16 in sequence. Those subsampling circuits 11 to 16 are driven by the subsampling pulses sent from the subsampling pulse generator 10.

Next, the six-phase subsampling pulses are input from the subsampling circuits 11 to 16 to the I-axis determining circuit 17. The operation of the I-axis determining circuit is controlled on and off by the color burst gate signal $S_2'$ so as to output the selecting signal $S_4$ for the I-axis phase pulse to the selecting circuit 18. The six-phase subsampling pulses are applied from the pulse generator 10 to the selecting circuit. The I-axis phase pulse $S_5$ is determined from the six-phase subsampling pulses in response to the selecting signal $S_4$ and is output to the (N+1)th subsampling circuit 19. The chrominance signal $S_1$ is input to the (N+1)th subsampling circuit 19 and is subsampled by the I-axis phase pulse $S_5$. The resulting signal appears as the I-axis detecting output $S_3$ at the output terminal 9.

Figure 2:
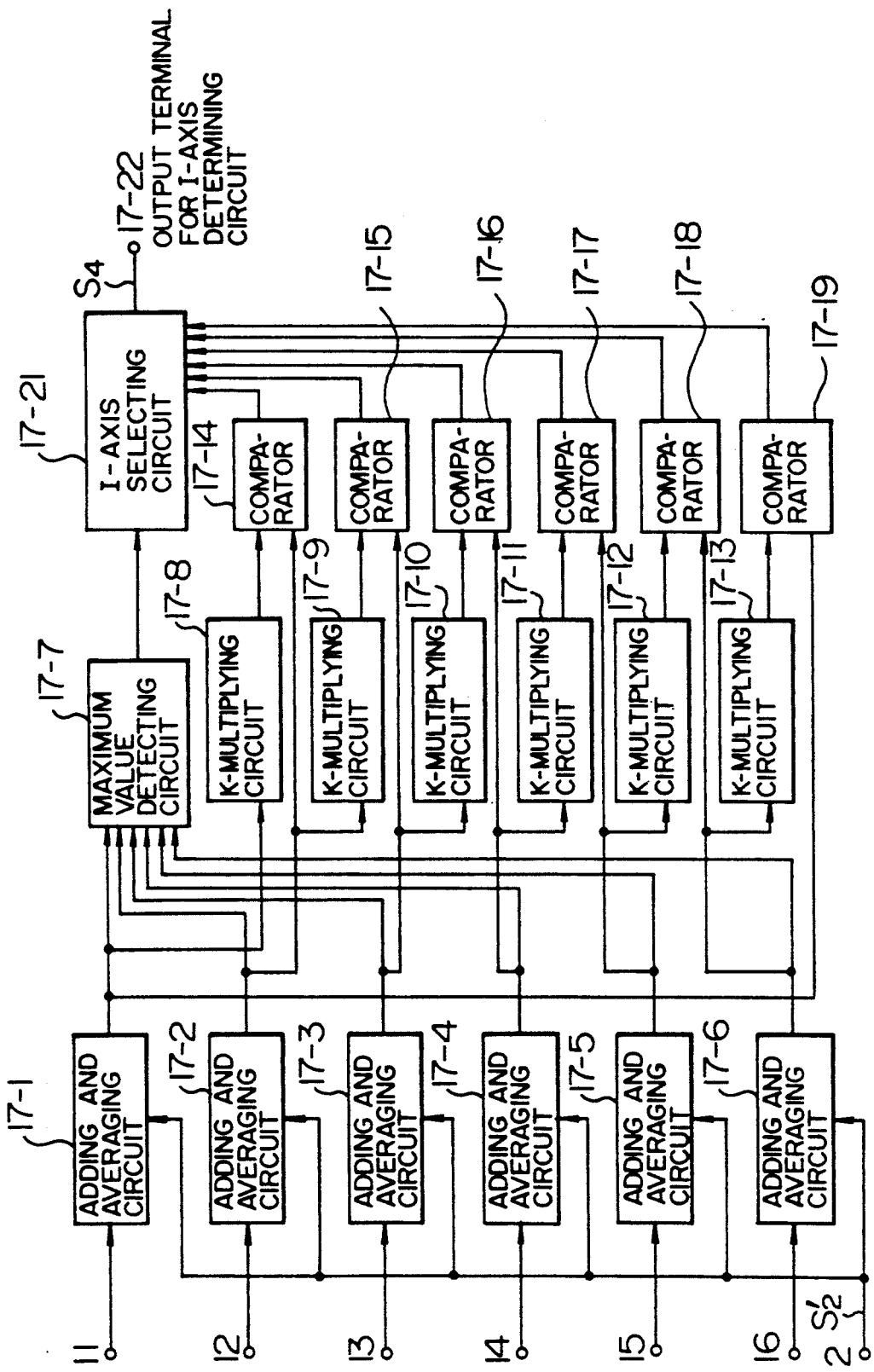
FIG. 2 is a block diagram showing an I-axis determining circuit shown in FIG. 1.

The I-axis determining circuit 17 shown in FIG. 1 is shown in a block diagram of FIG. 2. 17-1 to 17-6 denote adding and averaging circuits which are controlled on and off by the color burst and gate signal $S_2'$ input at the terminal 2. When the adding averaging circuits are controlled to be on, the subsampling pulses are output from the subsampling circuits 11 to 16 (see FIG. 1) to a maximum value detecting circuit 177 and K-multiplying circuits 17-8 to 17-13.

Figure 4A:
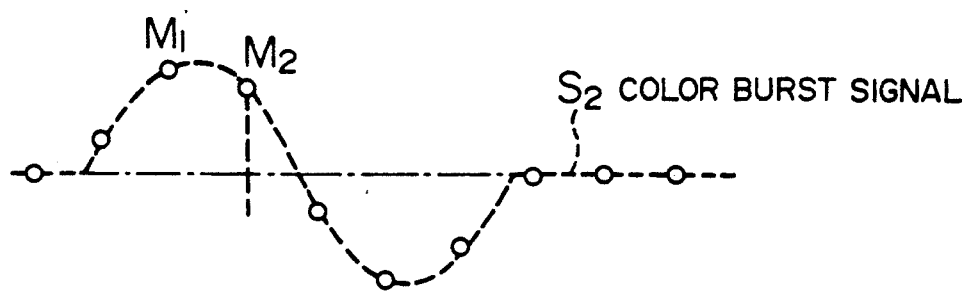
FIGS. 4A and 4B are waveform views for explaining the operation principle of a maximum detecting circuit shown in FIGS. 2 and 3.
Figure 4A:
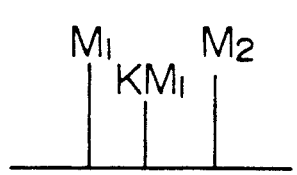

The maximum value detecting circuit 17-7 serves to detect a maximum value $M_1$ of the color burst gate signal $S_2$ (sampling frequency $f_1$) as shown in FIG. 4 and the value (data) $M_2$ of the color burst signal $S_2$ of after one clock. Each of the k-multiplying circuits 17-8 to 17-13 serves to multiply the added and averaged subsampling pulse sent from the adding and averaging circuits 17-1 to 17-6 by a factor of k. 17-14 to 17-19 are comparators. Each comparator serves to compare an output of the corresponding K-multiplying circuit for the m-th phase ($1 \leq m \leq N$) with an output of the corresponding adding and averaging circuit for the (m+1)th phase (if m+1>N, the adding and averaging circuit for the first phase is used). 17-21 denotes an I-axis selecting circuit which serves to select a proper one of the compared outputs of the comparators 17-14 to 17-19 based on the output of the maximum value detecting circuit 17-7. The selected output appears as the selecting signal $S_4$ for an I-axis phase pulse at an output terminal 17-22.

The function of the I-axis determining circuit 17 will be described later. The adding and averaging circuits 17-1 to 17-6 are controlled by part of a color burst period of each subsampling pulse sent from the subsampling circuits 11 to 16. The part of the color burst period corresponds to the color burst gate signal $S_2'$. When the color burst gate signal $S_2'$ is controlled to be on, the subsampling pulse is added and averaged and then the resulting output is sent to the maximum value detecting circuit 17-7 and the K-multiplying circuits 17-8 to 17-13, respectively.

During one cycle of the color burst signal $S_2$, the maximum value detecting circuit 17-7 serves to detect a maximum value $M_1$ of the color burst signal (sampling frequency $f_1$) and the data value $M_2$ of the color burst signal of after one clock.

Figure 4B:
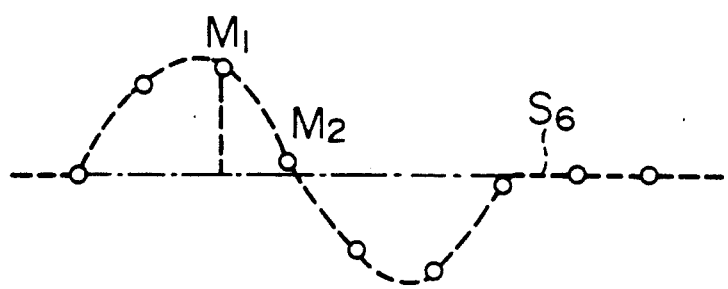
Figure 5:
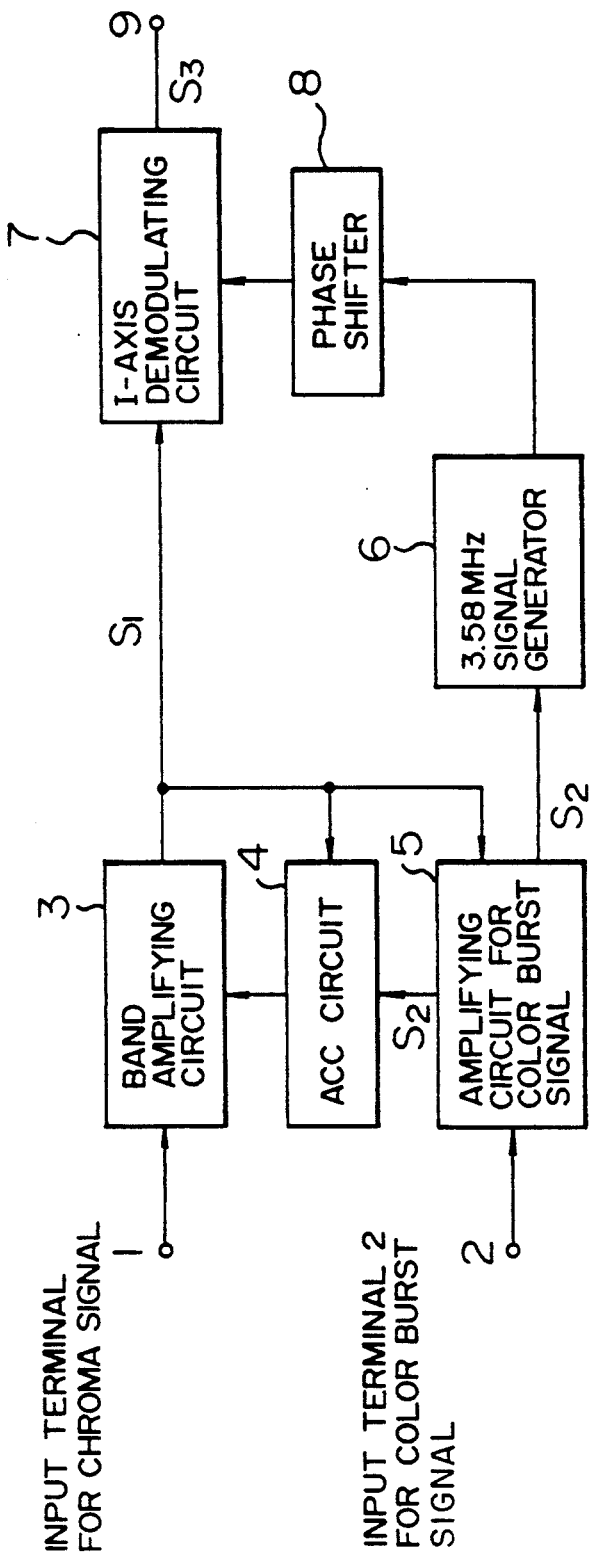
FIG. 5 is a block diagram a conventional I-axis detecting circuit.
Figure 6A:
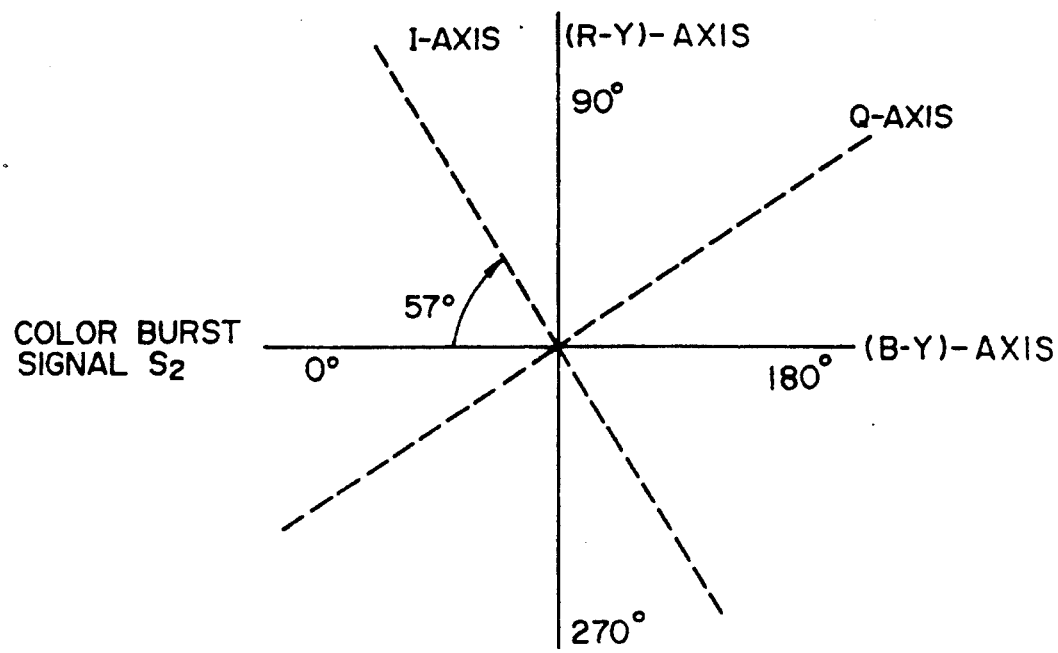
FIGS. 6A and 6B are waveform views for explaining the operation principle on which an I-axis detection output is obtained.
Figure 6B:
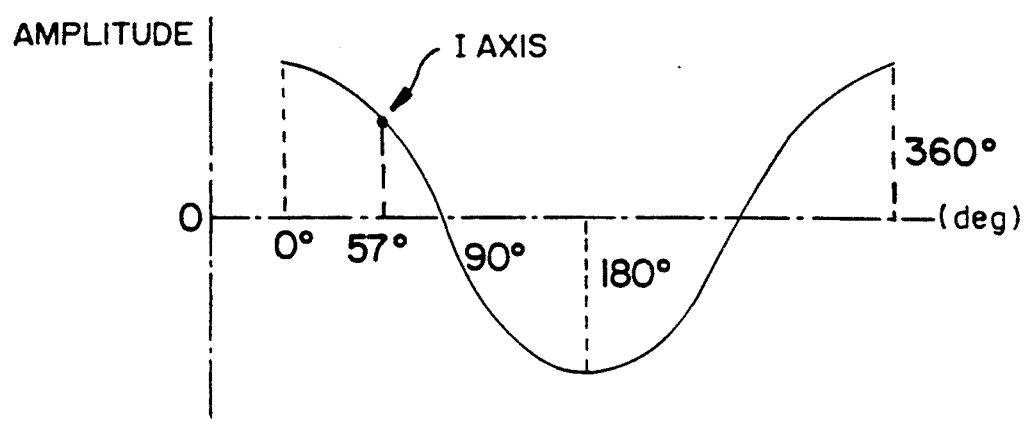

The comparators 17-14 to 17-19 serve to compare the value $KM_1$, that is, the maximum value $M_1$ multiplied by K in the K-multiplying circuits 17-8 to 17-13 with the data $M_2$. The compared result is output from the comparator to the I-axis selecting circuit 17-21. As shown in FIG. 4A, if $K.M_1 \leq M_2$, the pulse formed by subsampling the data of $M_2$ is selected as a selecting signal $S_4$ for the I-axis phase pulse and is supplied to the output terminal 17-22. As shown in FIG. 4B, if $K.M_1 > M_2$, the pulse formed by subsampling the data of $M_1$ is selected as a selecting signal $S_4$ for the I-axis phase pulse and is supplied to the output terminal 17-22.

The aforementioned operation makes it possible to detect the I axis both in the digital circuit and the analog circuit.

Figure 3:
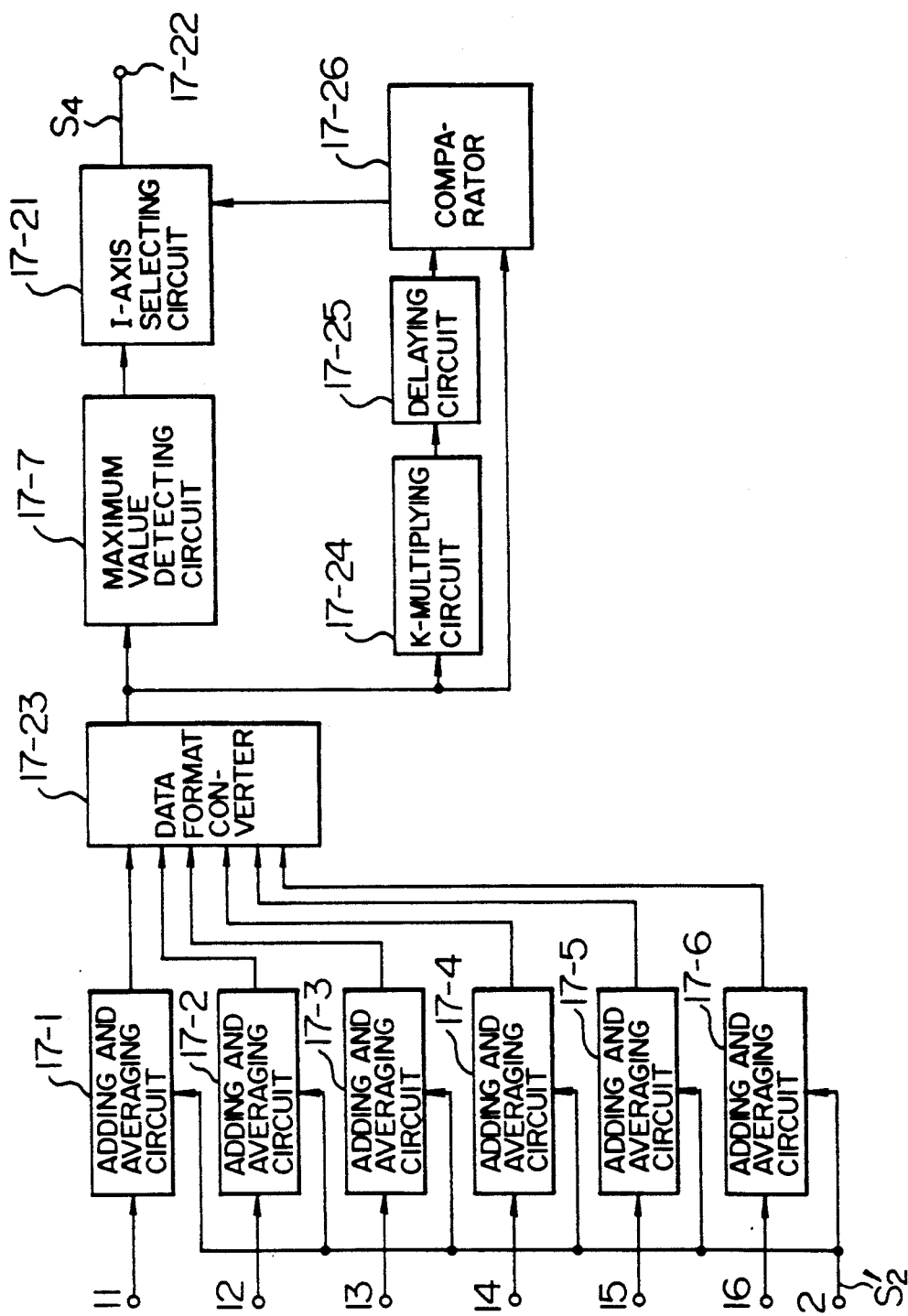
FIG. 3 is a block diagram showing another embodiment of the I-axis determining circuit shown in FIG. 1.

FIG. 3 is a block diagram showing another embodiment of the I-axis determining circuit 17. 17-23 denotes a data format converter, which serves to convert N parallel elements of data sent from the adding and averaging circuits 17-1 to 17-6 into the serial data. 17-24 denotes a circuit for multiplying the serial data by K and 17-25 denotes a circuit for delaying the output of the K-multiplying circuit by one clock. For example, the delaying circuit 17-25 may be arranged to have a flip-flop circuit. 17-26 denotes a comparator which serves to compare the serial data delayed by one clock with the serial data without any delay. The other blocks having the similar functions as those shown in FIG. 2 are referenced by the same numbers as those shown in FIG. 2.

The function of the I-axis determining circuit 17 will now be described. The same function of this embodiment as in the embodiment shown in FIG. 1 is not provided to avoid overlapped descriptions. The data format converter 17-23 operates to convert the N parallel elements of data output from the adding and averaging circuits 17-1 to 17-6 into the serial data. This operation can simplify circuit arrangement.

The serial data is sent to the maximum value detecting circuit 17-7 and the K-multiplying circuit 17-24. The circuit 17-7 serves to detect the maximum value $M_1$ of the color burst signal $S_2$ and the data value $M_2$ of the color burst signal after one clock from the serial data. The K-multiplying circuit 17-24 serves to multiply the serial data by K. Then, the K-multiplied serial data is delayed by one clock. The delayed data is input to the comparator 17-26 in which the delayed data is compared with the serial data without any delay sent from the I-axis selecting circuit 17-21. The compared output from the comparator is input to the I-axis selecting circuit 17-21. As described with respect to FIGS. 4A and 4B, if $K.M_1 \leq M_2$, the sampling pulse against $M_2$ is selected as a selecting signal for the I-axis phase pulse. If $K.M_1 > M_2$, the sampling pulse against $M_1$ is selected as the selecting signal. Then, the selecting signal appears at the output terminal 17-22.

What is claimed is:

1. An I-axis detecting circuit provided in a color demodulating circuit of a TV receiver comprising:
    first phase to N-th phase subsampling circuits for subsampling a chrominance signal (sampling frequency $f_1$) by a frequency $f_2$ ($f_1/N$) and by N subsampling pulses for the N phases, adjacent ones of said subsampling pulses being shifted with respect to each other by one clock ($1/f_1$);
    an I-axis determining circuit for providing a signal for selecting an I-axis phase pulse from said N subsampling pulses responsive to a color burst gate signal;
    a circuit for selecting and outputting a proper one of said N subsampling pulses as said I-axis phase pulse, based on a selecting signal for said I-axis determining circuit; and
    an (N+1)th subsampling circuit for subsampling said chrominance signal by the I-axis phase pulse output from said selecting circuit and supplying an I-axis detected output.

2. An I-axis detecting circuit as claimed in claim 1, wherein the I-axis determining circuit comprises:
    N adding and averaging circuits for receiving said first phase to N-th phase subsampling pulses and adding and averaging each of said subsampling pulses responsive to the color burst gate signal;
    a maximum value detecting circuit for detecting an output indicating a maximum value from each added and averaged output of said N adding and averaging circuits;
    an first phase to an N-th phase K-multiplying circuits for multiplying each added and averaged output of said N adding and averaging circuits by a factor of K;
    comparator means for m phases ($1 \leq m \leq$) for comparing an output of said K-multiplying circuit for the m-th phase with an output of said adding and averaging circuit for the (m+1)th phase (if m+1>N, the adding and averaging circuit for the first phase); and
    an I-axis selecting circuit for obtaining a signal for selecting an I-axis phase pulse from the outputs of said maximum value detecting circuit and said comparators for the m phases ($1 \leq m \leq N$).

3. An I-axis detecting circuit as claimed in claim 1, wherein said I-axis determining circuit comprises:
    N adding and averaging circuits for receiving first phase to N-th phase subsampling pulses and adding and averaging said subsampling responsive to a color burst gate signal;
    a data format converter for converting N parallel elements of added and averaged data into serial data;
    a K-multiplying circuit for multiplying an output of said data format converter by a factor of K;
    a circuit for delaying the output of said K-multiplying circuit by one clock;
    a comparator for comparing both of the outputs of said delaying circuit and said data format converter with each other; and
    an I-axis selecting circuit for obtaining a selecting signal for selecting an I-axis phase pulse from the outputs of said comparator and said maximum value detecting circuit.

* * * * *